(12) United States Patent
Mezack et al.

(10) Patent No.: US 10,111,298 B2
(45) Date of Patent: Oct. 23, 2018

(54) LED LIGHT FIXTURE DIMMING APPARATUS

(71) Applicant: Tempo Industries, LLC, Irvine, CA (US)

(72) Inventors: Gary Mezack, Florissont, CO (US); Michael D. Bremser, Seal Beach, CA (US); Dennis Barton, Costa Mesa, CA (US)

(73) Assignee: Tempo Industries, LLC, Irvine, CA (US)

( * ) Notice: Subject to any disclaimer, the term of this patent is extended or adjusted under 35 U.S.C. 154(b) by 0 days.

(21) Appl. No.: 15/657,066

(22) Filed: Jul. 21, 2017

(65) Prior Publication Data

US 2018/0054869 A1     Feb. 22, 2018

Related U.S. Application Data

(60) Provisional application No. 62/377,655, filed on Aug. 21, 2016.

(51) Int. Cl.
| | | |
|---|---|---|
| *H05B 33/08* | (2006.01) | |
| *H05B 39/04* | (2006.01) | |
| *H05B 37/02* | (2006.01) | |

(52) U.S. Cl.
CPC ..... *H05B 33/0884* (2013.01); *H05B 33/0815* (2013.01); *H05B 33/0818* (2013.01); *H05B 39/048* (2013.01); *H05B 37/0254* (2013.01)

(58) Field of Classification Search
CPC ............ H05B 33/0815; H05B 33/0818; H05B 33/0884; H05B 33/0809; H05B 33/0848; H05B 33/0896; H05B 37/0245; H05B 37/0254; H05B 41/3925; H05B 41/391; H05B 41/2828; H05B 33/0803; H05B 37/0272; H05B 33/0857; H05B 33/0887
USPC ............... 315/294, 136, 307, 122, 192, 224
See application file for complete search history.

(56) References Cited

U.S. PATENT DOCUMENTS

| | | | | |
|---|---|---|---|---|
| 6,459,919 | B1* | 10/2002 | Lys | A61N 5/0616 315/291 |
| 9,307,588 | B2 | 4/2016 | Li et al. | |
| 9,642,202 | B2 | 5/2017 | Li et al. | |
| 2009/0299500 | A1* | 12/2009 | Rubin | G06F 1/30 700/42 |
| 2013/0127362 | A1* | 5/2013 | Trainor | H02J 9/065 315/224 |
| 2013/0187631 | A1* | 7/2013 | Russell | G01R 19/2506 324/76.77 |
| 2014/0265844 | A1* | 9/2014 | Sadwick | H05B 33/0815 315/85 |

(Continued)

OTHER PUBLICATIONS ecosenselighting.com, EcoSense Linear Dimming Control Module—Plenum Rated: 0-10V, 450W/120V, 1000W/277V, Grey, 2014, pp. 1-3, EcoSense Lighting Inc., Los Angeles, California.

(Continued)

*Primary Examiner* — Douglas W Owens
*Assistant Examiner* — Syed M Kaiser
(74) *Attorney, Agent, or Firm* — Lapple Ubell IP Law, LLP; Franklin D. Ubell

(57) ABSTRACT

A microcontroller receives a LINE SYNC signal and a dimmer control voltage input and controls output switch timing of an output FET switch to generate a reverse phase PWM dimming signal for supply to associated LED driver apparatus.

34 Claims, 14 Drawing Sheets

(56) References Cited

U.S. PATENT DOCUMENTS

| | | | | |
|---|---|---|---|---|
| 2014/0312869 | A1* | 10/2014 | Zulim | H02H 3/00 |
| | | | | 323/282 |
| 2014/0319932 | A1* | 10/2014 | Russell | H02J 3/01 |
| | | | | 307/125 |
| 2015/0334800 | A1* | 11/2015 | Fawaz | H05B 33/0812 |
| | | | | 315/294 |

OTHER PUBLICATIONS ecosenselighting.com, EcoSense Linear Dimming Control Module: 0-10V, 2013, pp. 1-4, EcoSense Lighting Inc., Los Angeles, California.

* cited by examiner

LED LIGHT FIXTURE DIMMING APPARATUS

RELATED APPLICATIONS

This application claims the benefit of and priority to U.S. Provisional Patent Application Ser. No. 62/377,655, filed Aug. 21, 2016 and entitled "LED LIGHT FIXTURE DIMMING APPARATUS," which Application is incorporated herein by reference in its entirety.

BACKGROUND OF THE DISCLOSURE

Field of the Disclosure

The subject disclosure relates to LED light fixtures and more particularly to dimming circuitry for providing a dimming signal to LED driver apparatus.

Related Art

In the past, circuitry has been provided for dimming the output of LED light fixtures.

SUMMARY

According to illustrative embodiments, apparatus for controlling supply of power to an LED driver is provided. In one embodiment, an AC line input signal is supplied to an AC-DC power supply and a line sync signal generating circuit is configured to generate a line sync signal. A microcontroller is configured to receive the line sync signal and a dimmer input signal and to generate a gate control signal for controlling the power supplied to an LED driver so as to cause a selected amount of dimming of an LED light source to occur. In illustrative embodiments, optoisolators may be employed to supply the line sync signal and to supply a gate control voltage for driving an output field effect transistor employed to generate a dimming control voltage for supply to the LED driver.

In one embodiment, zero-crossing detection is based on a trailing edge of the line sync signal, and power is supplied to the LED driver in the form of a reverse phase pulse width modulated signal. Further, in illustrative embodiments, the microcontroller is configured to select the amount of dimming based at least in part on the magnitude of the dimmer input signal. In illustrative embodiments, the input dimmer signal is a DC voltage in the range of zero to ten volts. In other embodiments, the input dimmer signal may be derived from or directly provided by a wall dimmer switch or other sources.

According to another aspect of the disclosure, a method for supplying power to an LED driver is provided comprising providing an AC-DC power supply with an AC line input signal, generating a line sync signal by monitoring the current drawn by the AC-DC power supply, and employing an input dimmer signal and the line sync signal to generate a gate control signal to control the power supplied to the LED driver. In various embodiments, the gate control signal is controlled so as to cause a selected amount of dimming of an LED light source. Additionally, illustrative methods may further comprise supplying a microcontroller with the dimmer signal and the line sync signal and employing the microcontroller to generate the gate control signal.

Methods according to illustrative embodiments may further comprise supplying power to the LED driver in the form of a reverse phase pulse width modulated signal and may further comprise determining a zero crossing point based on the trailing edge of the line sync signal. Illustrative methods may further comprise employing the magnitude of the dimmer input signal to determine the selected amount of dimming. In illustrative methods and apparatus, the dimmer signal may be in the range of zero to ten volts DC.

According to another aspect of the disclosure, dimming circuitry for providing a dimming signal to LED driver apparatus is provided comprising an AC-DC power supply provided with an AC line input signal and configured to generate a DC supply voltage and a line sync signal generating circuit connected to monitor the current drawn by the AC-DC power supply to generate a line sync signal. In one embodiment, the line sync generating circuit may comprise a bridge circuit having first and second outputs connected across a Zener diode and a capacitor wherein the second output is supplied to an optoisolator circuit, an output of which comprises the line sync signal. In one embodiment, the power supply draws all of its power on a rising edge of an input power sine wave and the line sync circuit monitors the current drawn by the power supply to detect the peak of the sine.

DETAILED DESCRIPTION

An illustrative dimming circuitry embodiment comprises a microcontroller based device to control power supplied to LED light fixtures. The device may receive a standard 0-10 v dimmer control signal and may modify an AC line voltage input based on the control signal to output a reverse phase pulse width modulated (PWM) voltage output to power standard LED drivers.

In an illustrative embodiment, a line fusing and filter section may provide AC input fusing, transient protection, and noise filtering. An isolated AC to DC Supply section provides power for the microcontroller and the signals for line sync. A 0-10 volts filter and protection block receives the external control signal and provides filtering and overload protection. The microcontroller monitors the line sync signal and dimmer control signal to control output switch timing to generate the reverse phase PWM output. Benefits of this method include excellent noise immunity, low parts count, and low idle power. In one embodiment. The microcontroller is isolated for both input and output and oversees all functions.

In an illustrative embodiment, a single FET-based AC Switch section provides the modified reversed phase PWM output. This section may also provide current feedback for drive and overcurrent protection.

In illustrative embodiments, hardware device protection is multipronged: AC line protection may be provided for voltage overload, incorrect wiring, and transients. On the 0-10 volt signal input, protection is provided for overvoltage of the input, such as the line voltage accidentally being wired to the 0-10 volt input, reversed polarity, and an open 0-10 input. The output may be protected against accidental wiring of the AC input to the output and to regulate the output current loads in the event over driving. In one embodiment, an LED driven by the microcontroller may indicates errors, and may report seven different error states with a human readable error code. The firmware also may provide traps for error conditions, such as overcurrent feedback, false line sync reads, line frequency variations, and brown out conditions.

Figure 1:
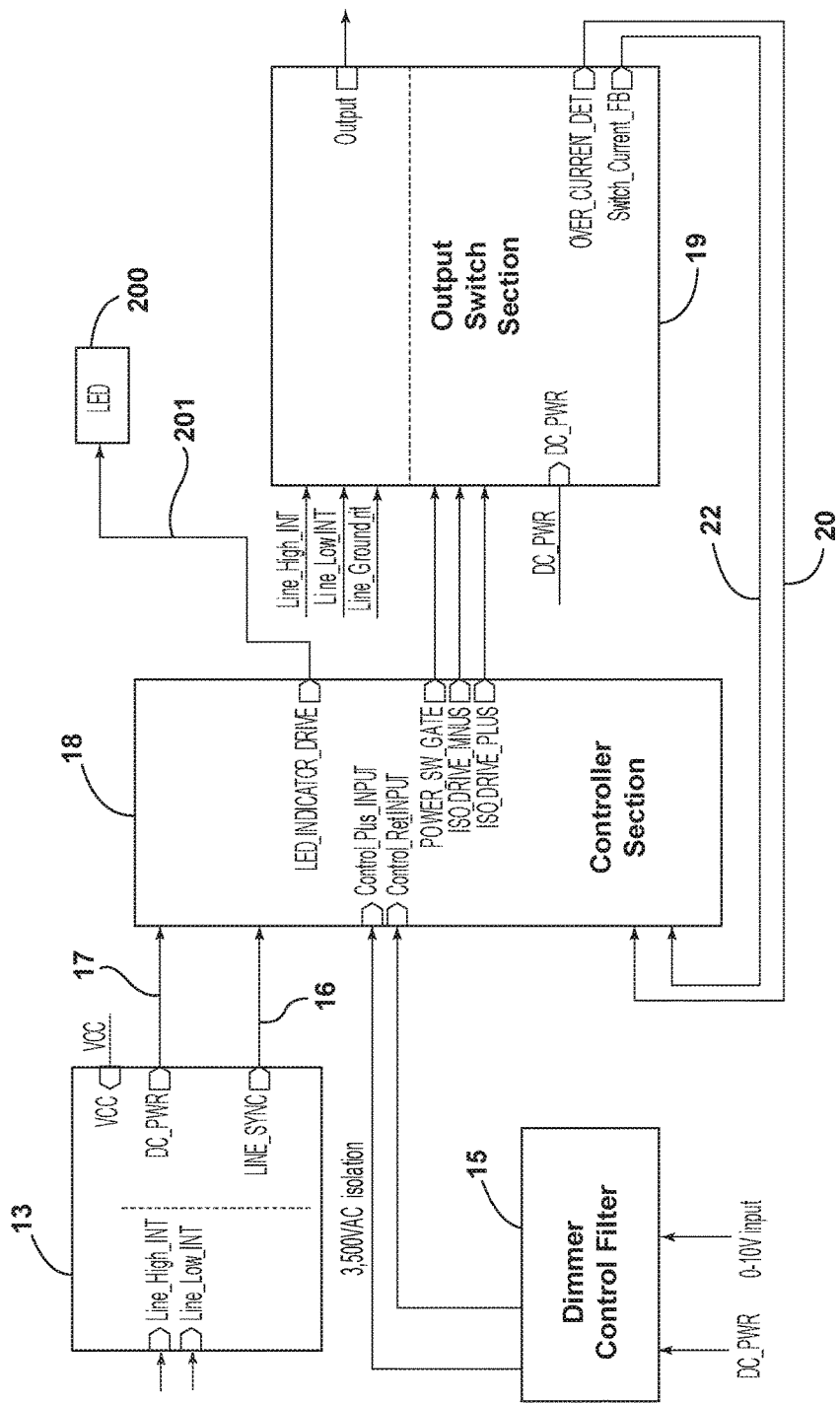
FIG. 1 is a circuit block diagram of dimming circuitry according to an illustrative embodiment.

A block diagram of an illustrative embodiment is shown in FIG. 1. As shown, the illustrative embodiment includes an AC input section 13, a dimmer control voltage filter block 15, a dimmer controller section 18, and a dimmer output switch section 19.

The AC input section 13 of FIG. 1 provides AC input fusing, transient protection, and noise filtering, as well as an isolated AC to DC power supply. In illustrative embodiments, the AC to DC power supply receives an AC power input and converts it to a DC voltage designated DC PWR, which is supplied to the controller section 18 on a signal line 17. The AC input section 13 also generates a line sync signal LINE_SYNC, which is also supplied to the control section 18 on a signal line 16.

The control voltage filter block 15 of FIG. 1 receives an external voltage which comprises a DC input voltage in the range of 0-10 volts and which is subjected to filtering and overload protection. The filter block 15 supplies a control voltage input to the dimmer controller section 18 at inputs which are designated Control_Plus_Input and Control_Ret_Input.

The dimmer output switch section 19 of FIG. 1 comprises a single FET based AC Switch section which outputs a modified reversed phase PWM signal, as will be discussed in further detail below. The dimmer output switch section 19 also provides current feedback on signal lines 20, 22 for drive and overcurrent protection.

Figure 5:
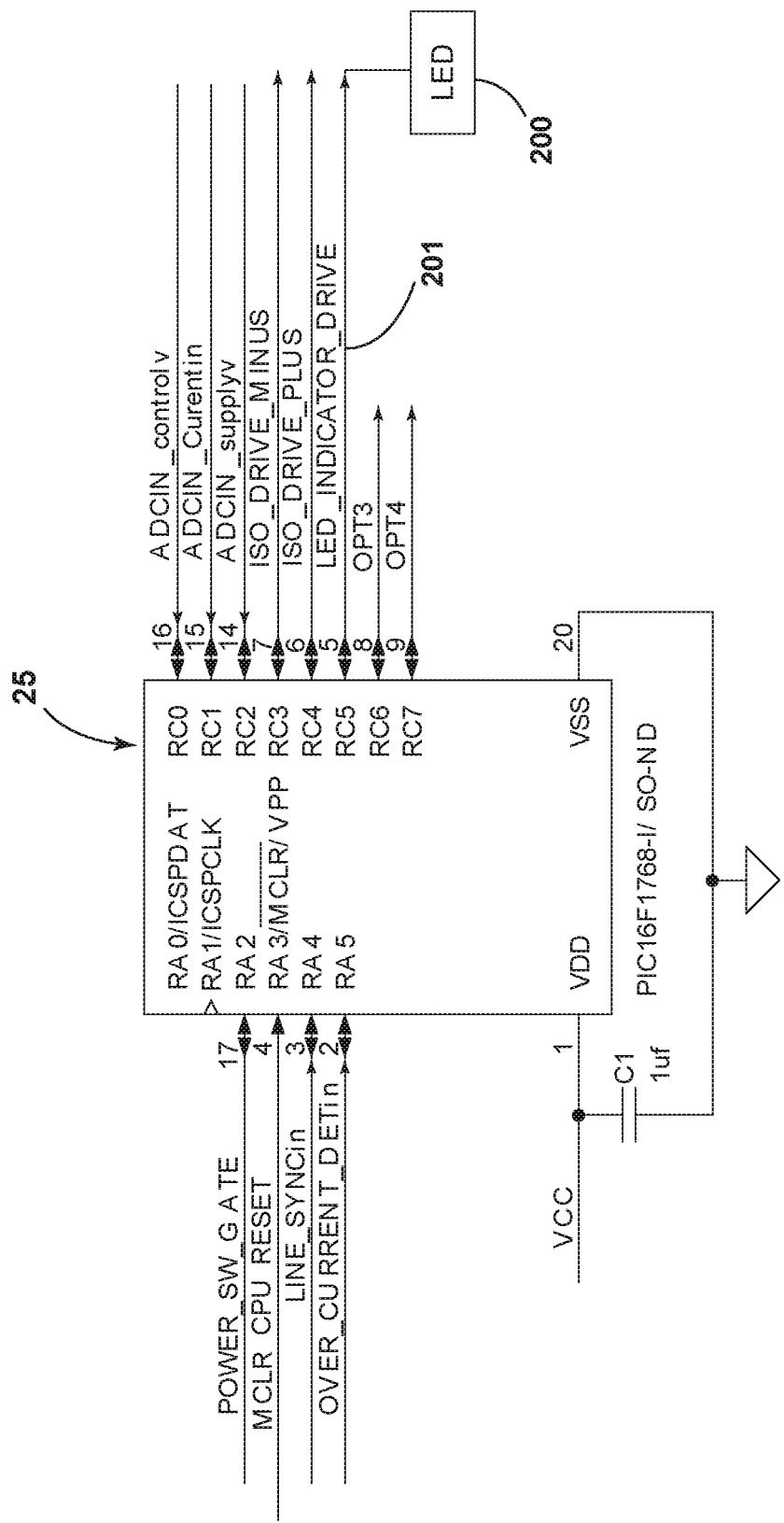
FIG. 5 illustrates a microcontroller according to an illustrative embodiment.

The dimmer controller section 18 of FIG. 1 is isolated for both input and output and is based on a microcontroller 25 illustrated in more detail in FIG. 5. In overall operation, the microcontroller 25 monitors the LINE_SYNC signal and a dimmer control voltage input ADCIN_control v and controls output switch timing via a control signal PWR_SW_GATE to generate the reverse phase PWM output. While a microcontroller is employed in the illustrative embodiment, other embodiments could employ hard wired logic or other types of controllers or control circuitry to perform various functions of the microcontroller 25.

Figure 2:
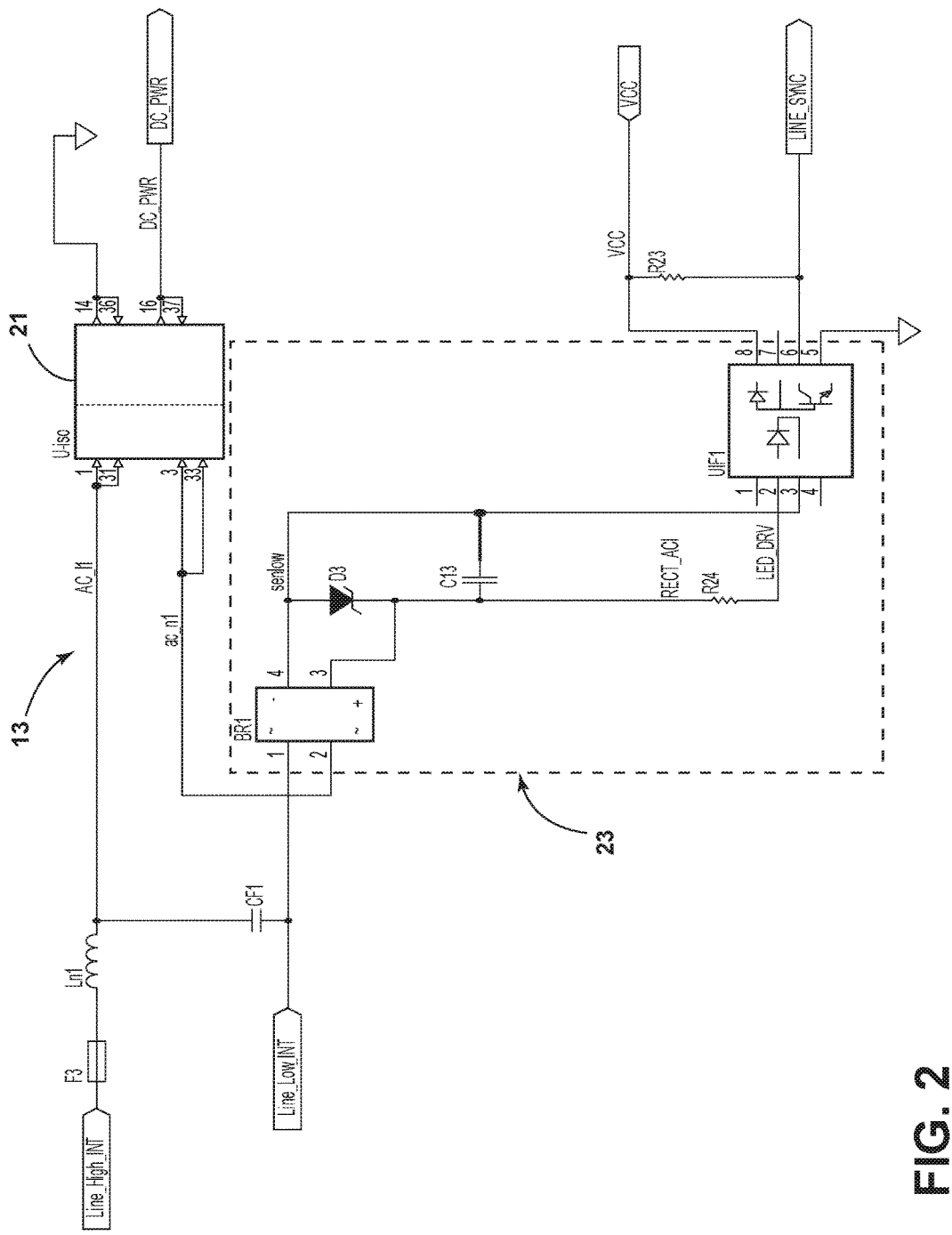
FIG. 2 is a circuit diagram of an AC-DC power supply and line sync generation circuit according to an illustrative embodiment.

An illustrative embodiment of the AC input circuit section 13 is shown in FIG. 2 The circuitry of FIG. 2 includes a line filter and fusing section comprising a fuse F3, an inductor Ln1 and a capacitor CF1. This circuitry receives Line High NT and Line Low NT inputs from an AC line voltage and supplies a first input AC_l1 to an AC/DC power supply 21 and a second input to an input terminal of a bridge circuit BR1, which is part of a Line_Sync generating circuit 23. The bridge circuit BR1 provides a second input ac_n1 to the power supply 21, which in turn generates the DC PWR voltage output. In one embodiment the bridge BR1 may be a part no. BO10SG SMD glass passivated as available from Comchip Technology Company, Ltd.

In the circuit of FIG. 2, second and third outputs of the bridge circuit BR1 are connected across a Zener diode D3 and a capacitor C13. The second output signal, designated "senlow," is supplied as a first input to an optoisolater circuit U1F1, while the third output is supplied through a resistor R24 to a second input of the circuit U1F1 to drive an LED, which is part of U1F1. U1F1 may be a part no. 6N136S-TA1. The optoisolater U1F1 further receives a bias voltage VCC and outputs the LINE_SYNC signal, which is applied as one input to the microcontroller 25 of FIG. 5.

Figure 3:
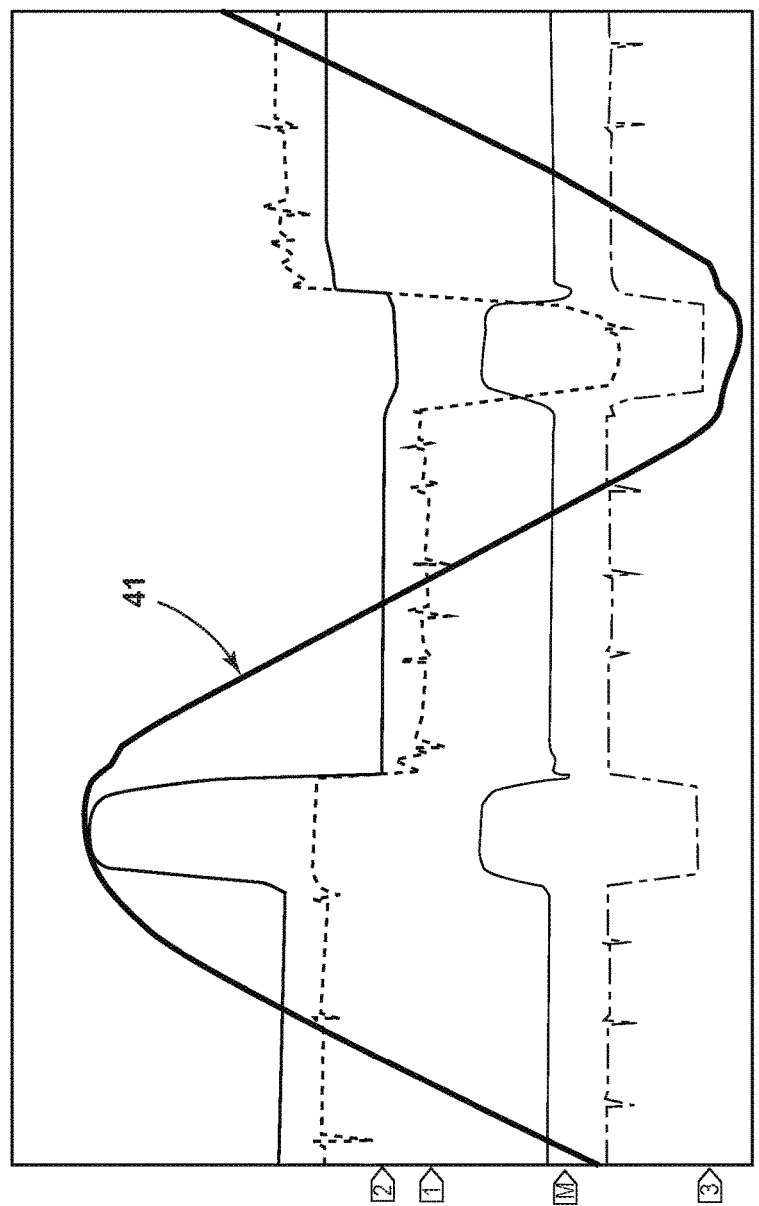
FIG. 3 is a waveform diagram illustrative of waveforms at various points in the circuit of FIG. 2.

FIG. 3 illustrates signal waveforms at various points in the circuitry of FIG. 1. In particular, FIG. 3 shows the AC line input waveform 41, the senlow waveform, the RECT_ACI waveform, the LED_DRV waveform and the LINE_SYNC waveform. In the waveform diagram of FIG. 4, the Line Voltage waveform is the AC line voltage into the system, the U-ISO current waveform is the primary current of AC-DC power supply 21, the LED_DRV waveform is the drive signal supplied to the internal LED of the optoisolator U1F1, the LINE_SYNC waveform is the sync signal supplied by U1F1 to the microcontroller 25 (FIG. 5), and the POWER_SW_GATE waveform is the gate drive to the dimmer's main power output switch 29 (FIG. 7).

Figure 4:
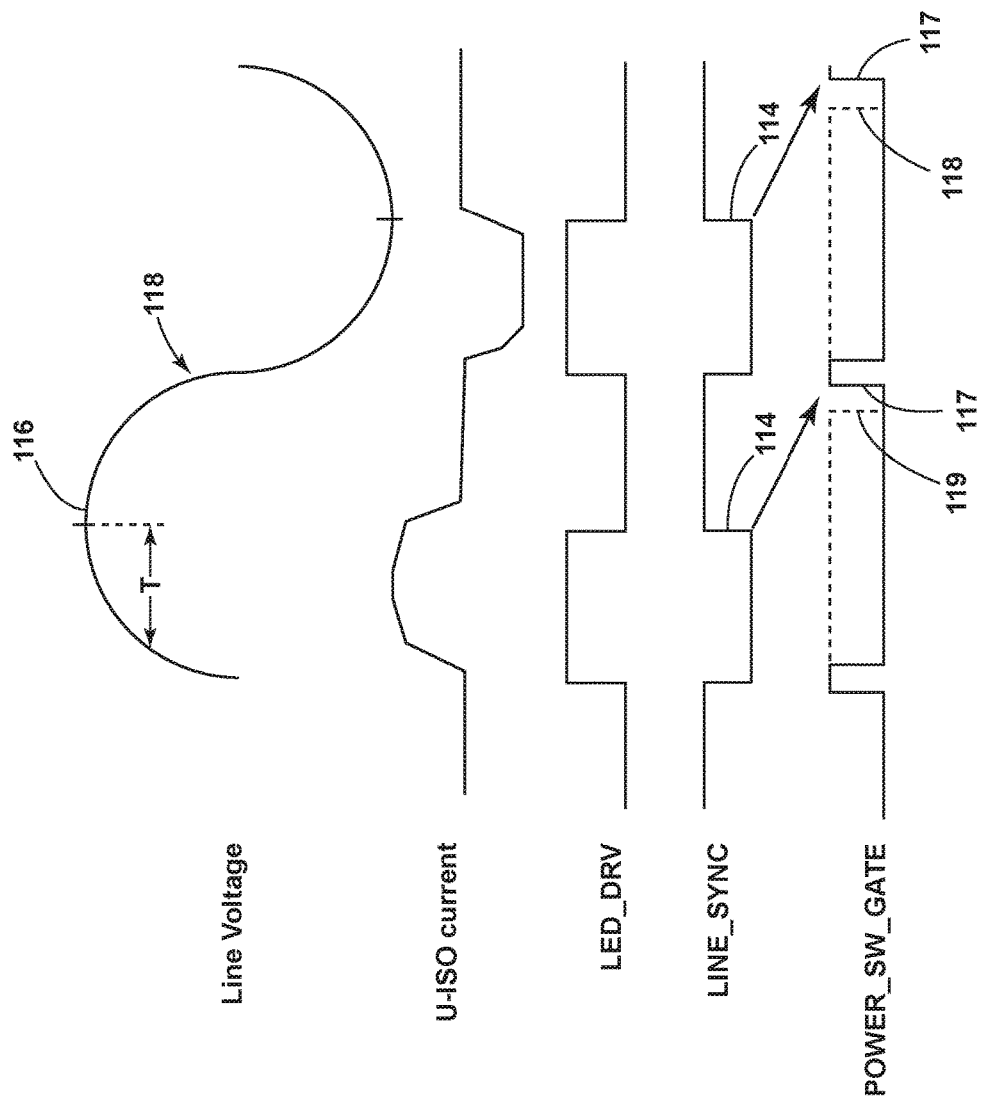
FIG. 4 is a waveform diagram illustrating operation of an illustrative embodiment.

With respect to FIG. 4, the power supply 21 of FIG. 2 draws all of its power on the rising edge of the input power sine wave 118 during interval T and stops drawing current after the peak of the sine wave 118. The Line Sync circuit 23 monitors the level of the U-ISO current drawn by the power supply 21 to detect the peak 116 of the sine and supplies the LED_Drive signal to the optoisolator U1F1. A rectifier and LED inside the optoisolator U1F1 function as a level detector to detect the stoppage of current after the peak 116 of the sine wave 118 and to generate the output "LINE_SYNC" signal supplied to the microcontroller 25.

Figure 6:
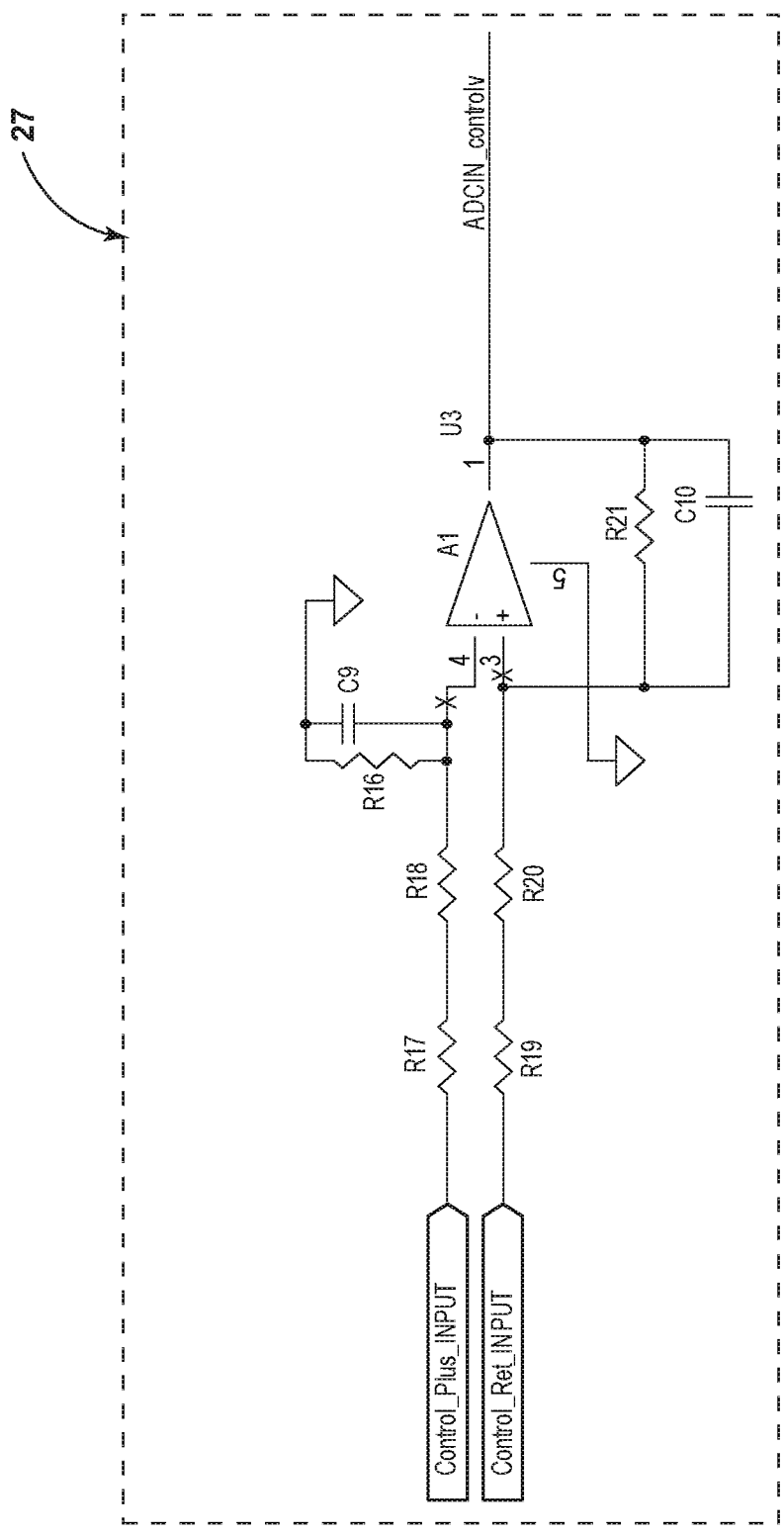
FIG. 6 is a circuit diagram of circuitry which forms part of the dimmer control circuitry according to an illustrative embodiment.

In one illustrative embodiment, the dimmer control section 18 includes an amplifier A1 shown in FIG. 6, which receives the outputs from the dimmer control voltage filter 15 as inputs on lines Control Plus_Input and Control Ret_Input. The amplifier A1 outputs an isolated control voltage "ADCIN control v" to the microcontroller 25. As mentioned above, the control voltage ADCIN control v may be derived from a 0 to 10 volt input signal. A variable resistive load can also be applied across the inputs of the dimmer control filter 15, such as the output of a wall dimmer. In one embodiment, the control section 18 may further include circuitry which converts the DCPWR voltage to a suitable bias voltage VCC and a voltage ADCin_supplyv, which is monitored by for the microcontroller 25 to detect any abnormal condition in the DCPWR voltage level. In an illustrative embodiment, DCPWR may be 15 volts, while VCC may be 5 volts DC.

Figure 7:
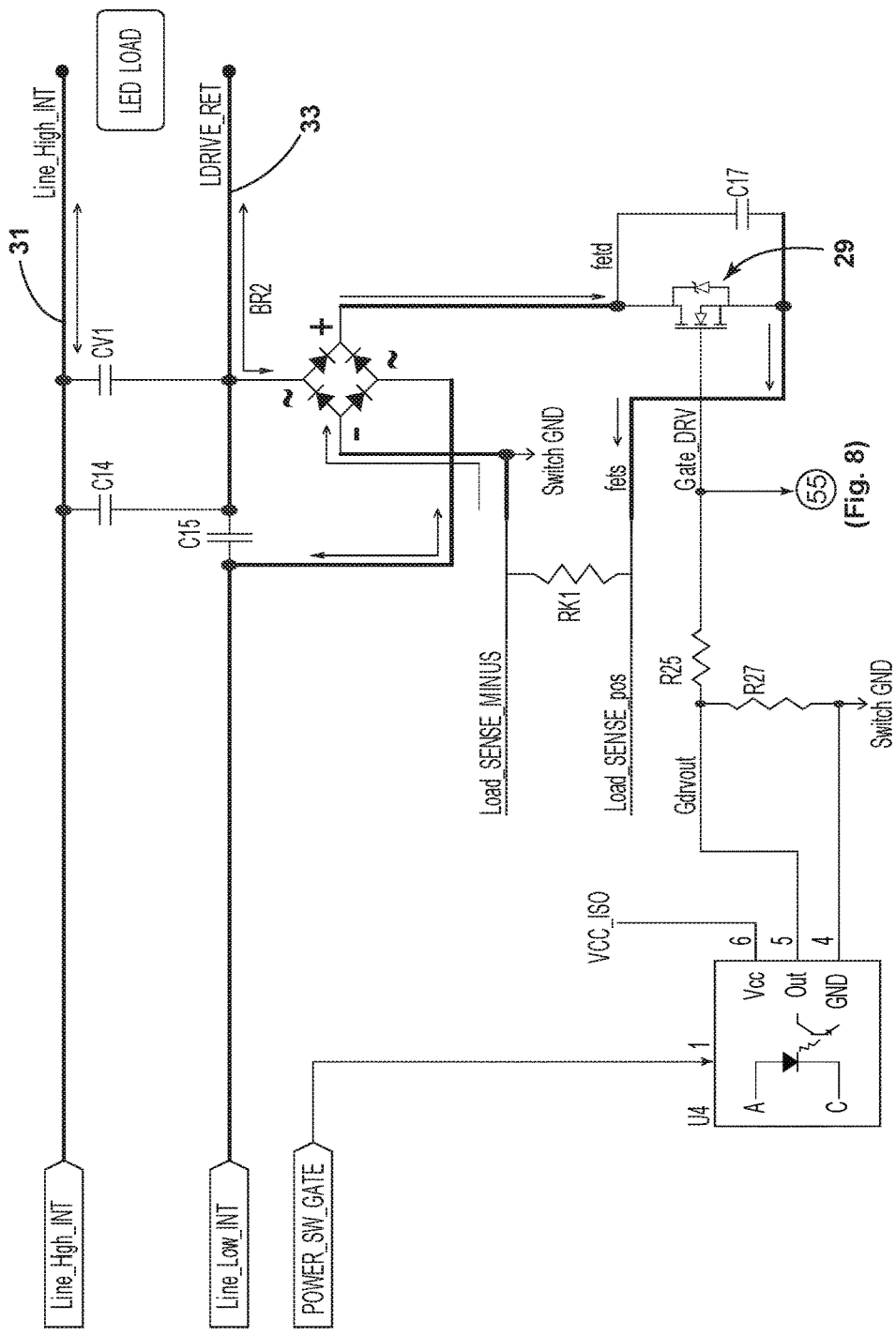
FIG. 7 is a circuit diagram of output circuitry of an illustrative embodiment.

As noted above, in response to the signal "ADCIN control v" and the LINE_SYNC signal, the microcontroller 25 generates and supplies the POWER_SW_GATE control signal to the output switch circuit 19 of FIG. 1, which controls switching of an output FET 29 shown in FIG. 7 to deliver an LED Drive voltage across output terminals of signal lines 31, 33 of FIG. 7. This LED Drive voltage is an AC signal for supply to an external LED driver.

As shown in FIG. 7, in one illustrative embodiment, the PWR_SW_GATE signal is supplied to an optoisolator gate driver U4, which in one embodiment may be a part no. TLP152. A resistor R27 is connected between the output pin 5 of the driver U4 and ground, and the output pin 5 of the driver U4 is connected via a resistor R25 to the gate of the output FET 29. The source of the FET 29 is connected to the + terminal of an AC current to DC current bridge BR2, which in one embodiment may be a 35 volt, 1000 volt bridge, part no. G6BC. The negative terminal of the bridge BR2 is connected to ground, while its third and fourth terminals are connected to the return line 33 and to a first terminal of an MOV varistor C15, respectively. The second terminal of the MOV varistor C15 is connected to the return line 33, which is in turn coupled to the Line_Hgh_INT input line 31 via a capacitor C14 and an MOV varistor CV1. The LED load, such as for example a conventional LED driver, is then connected between the drive line and return lines 31, 33. The MOV varistors C15 and CV1 protect against high voltage transients on the output lines.

Figure 8:
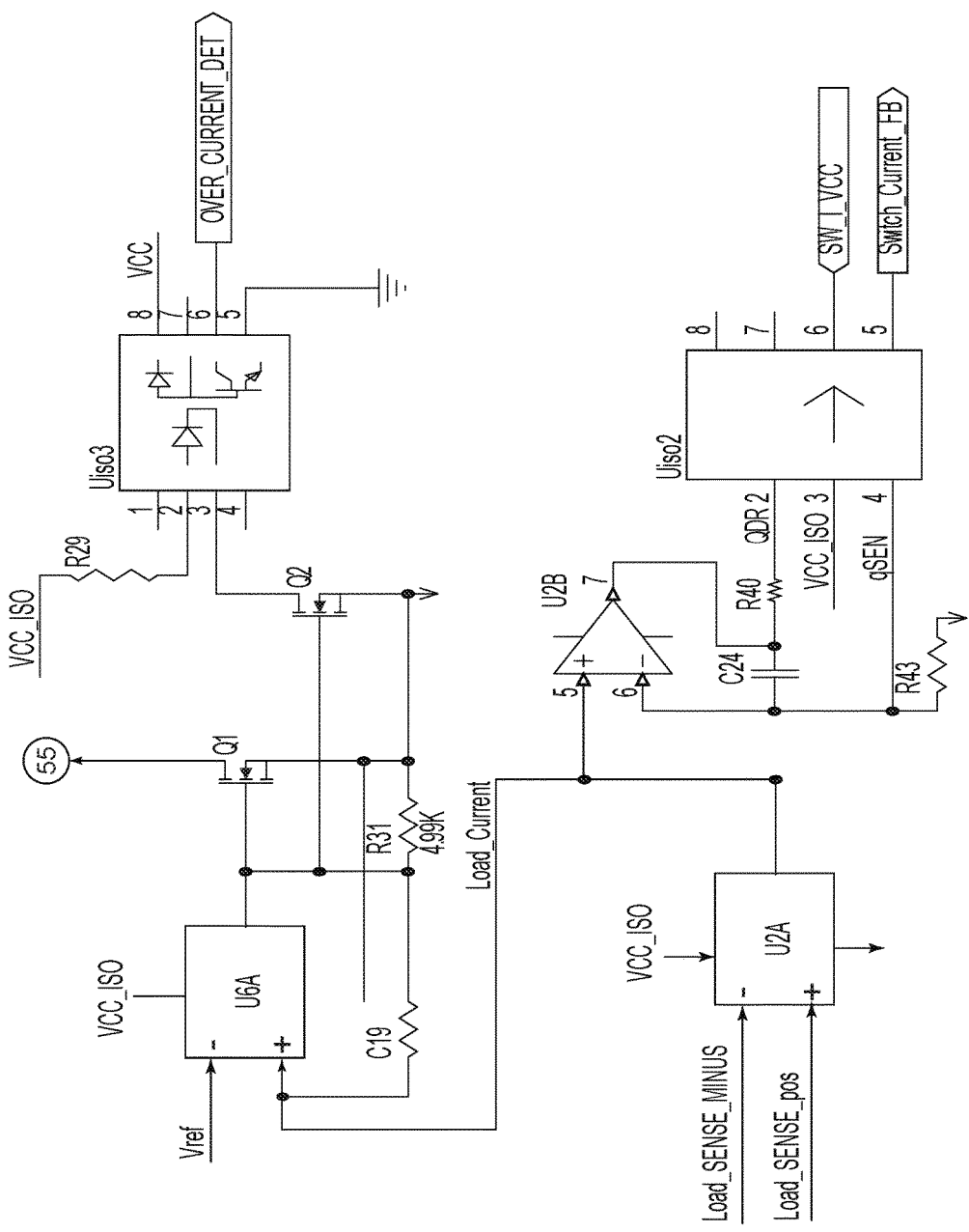
FIG. 8 is a circuit diagram of current monitoring circuitry according to an illustrative embodiment.
Figure 9:
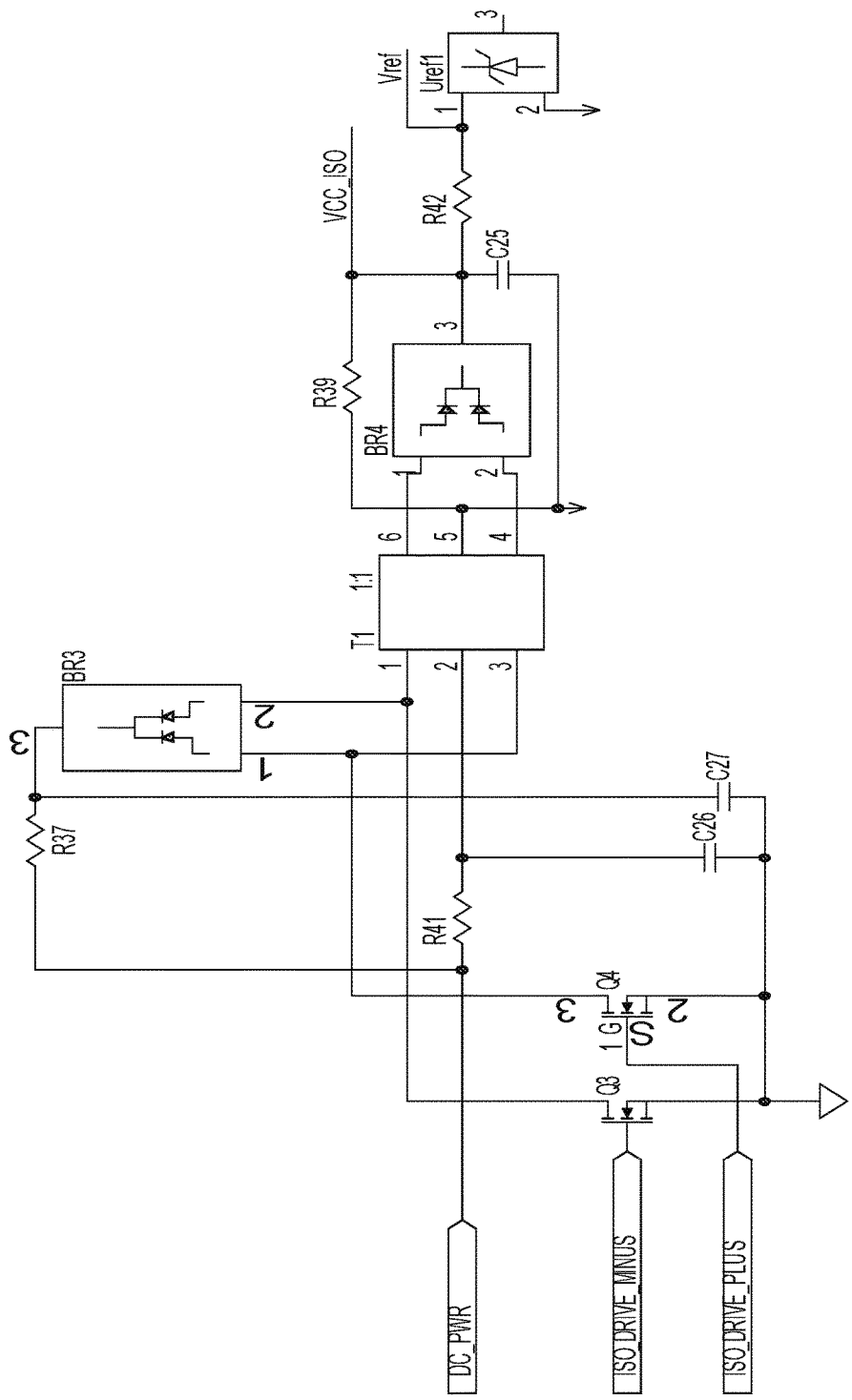
FIG. 9 is a circuit diagram of a reference voltage generation circuit according to an illustrative embodiment.

In one embodiment, the gate driver U4 is supplied with an isolated power supply voltage VCC_ISO, which may be generated by a DC to DC converter circuit supplied with the DCPWR voltage and non-overlapping clock signals ISO-DRIVE MINUS and PLUS supplied by the microcontroller 25. An illustrative converter circuit is shown in FIG. 9 and comprises third and fourth MOSFETs Q3, Q4, a 1:1 transformer T1, and rectifiers BR3 and BR4. This circuit also generates a reference voltage Vref for the circuit of FIG. 8.

In one embodiment, the drain of the FET 29 is connected to a first terminal of a Kelvin resistor RK1, whose second terminal is connected to switch ground. As shown in FIG. 8, the signal across the Kelvin resistor RK1 is supplied to the inputs of a load current sensing amplifier U2A, which supplies an output representative of the magnitude of the current supplied to the LED load. This output is supplied as one input to an overload detection comparator amplifier U6A whose other input is the voltage reference signal Vref. The output of amplifier U6A will shut off the gate drive to the FET 29 via MOSFET Q1 in the event of an overcurrent condition and further cause generation of an over current detect signal via MOSFET Q2 at an output of an optoisolator Uiso3.

The output of the amplifier U2A is also connected to one input of an amplifier U2B, which serves to generate a current signal Switch Current FB via a linear optoisolator Uiso2. This current signal is filtered and averaged to provide a signal to the microcontroller 25 designated "ADCIN current in," which represents the average load current.

In one embodiment, the microcontroller 25 monitors for the average "on" current being too high, the average current in the off state being too high, the existence of an overcurrent condition, and whether the 15 volt supply voltage is out of spec, and, in response, generates a control signal on a signal line 201 to an LED 200 (FIG. 5). The control signal may cause the LED to blink a selected number of times to provide a visual indication of the error condition. For example, in one embodiment, the aforementioned four error conditions may be identified by four blinks, five blinks, six blinks and seven blinks respectively. Other error conditions may be similarly visually identified.

Overall operation of the dimming circuit of FIG. 1 may be further illustrated in connection with FIG. 4. The arrows in FIG. 4 illustrate the delay from each rising edge 114 of the LIN_SYNC signal to the rising edge 117 of the POWER_SW_GATE drive pulse generated by the microcontroller 25 in response to that edge 114. This edge 117 is controlled by software to align the start of output LED drive voltage with an actual zero crossing of the Line Voltage signal. The duration or width of each POWER_SW_GATE pulse is determined by the magnitude of the input voltage (e.g. 0 to 10 volts) or the value of a resistive wall dimmer presented to the input circuit 15 of FIG. 2. More particularly, in one embodiment, each valid LINE_SYNC triggers a one-shot (T1) that generates the delay to the actual zero crossing. An interrupt generated by T1 initiates a timer ("PWM on time") which is loaded with the presently set dimming level, which is extracted from memory using a table look up operation and which determines when the POWER_SW_GATE pulse ends. The delay imparted by the one-shot T1 is constant for a given line frequency and compensates for circuit delays so as to start the POWER_SW_GATE pulse such that the main power switch 29 (FIG. 7) turns "on" at the zero crossing. One embodiment may employ a check for loss of LINE_SYNC and may generate an error code and shutdown the output after a long delay. In one embodiment, the microcontroller software also may establish a blanking period to exclude any spurious line sync that could occur prematurely in the AC cycle.

Figure 11:
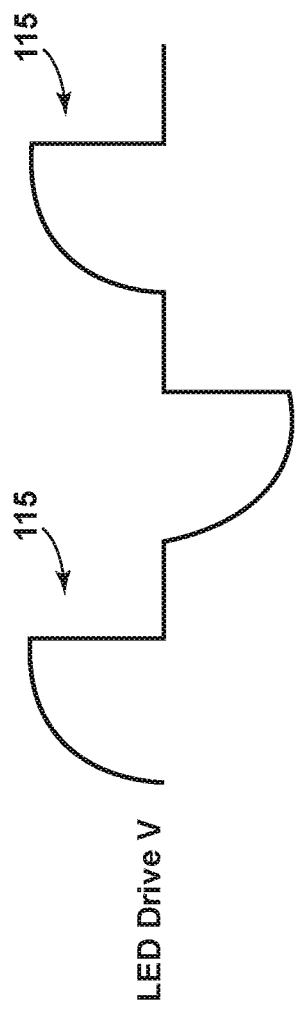
FIG. 11 is a waveform diagram of an illustrative output of an illustrative dimming circuit.

The LED Drive voltage at the terminals of signal lines 31, 33 of the illustrative embodiment is illustrated in FIG. 11 and consists of truncated sinusoidal pulses 115, each of which terminates at the falling edge 114 of a POWER_SW_GATE pulse. As shown in FIG. 7, in an illustrative embodiment, the train of POWER_SW_GATE pulses is supplied to a non-inverting optoisolator driver U4, which controls the gate of the FET 29.

Figure 10:
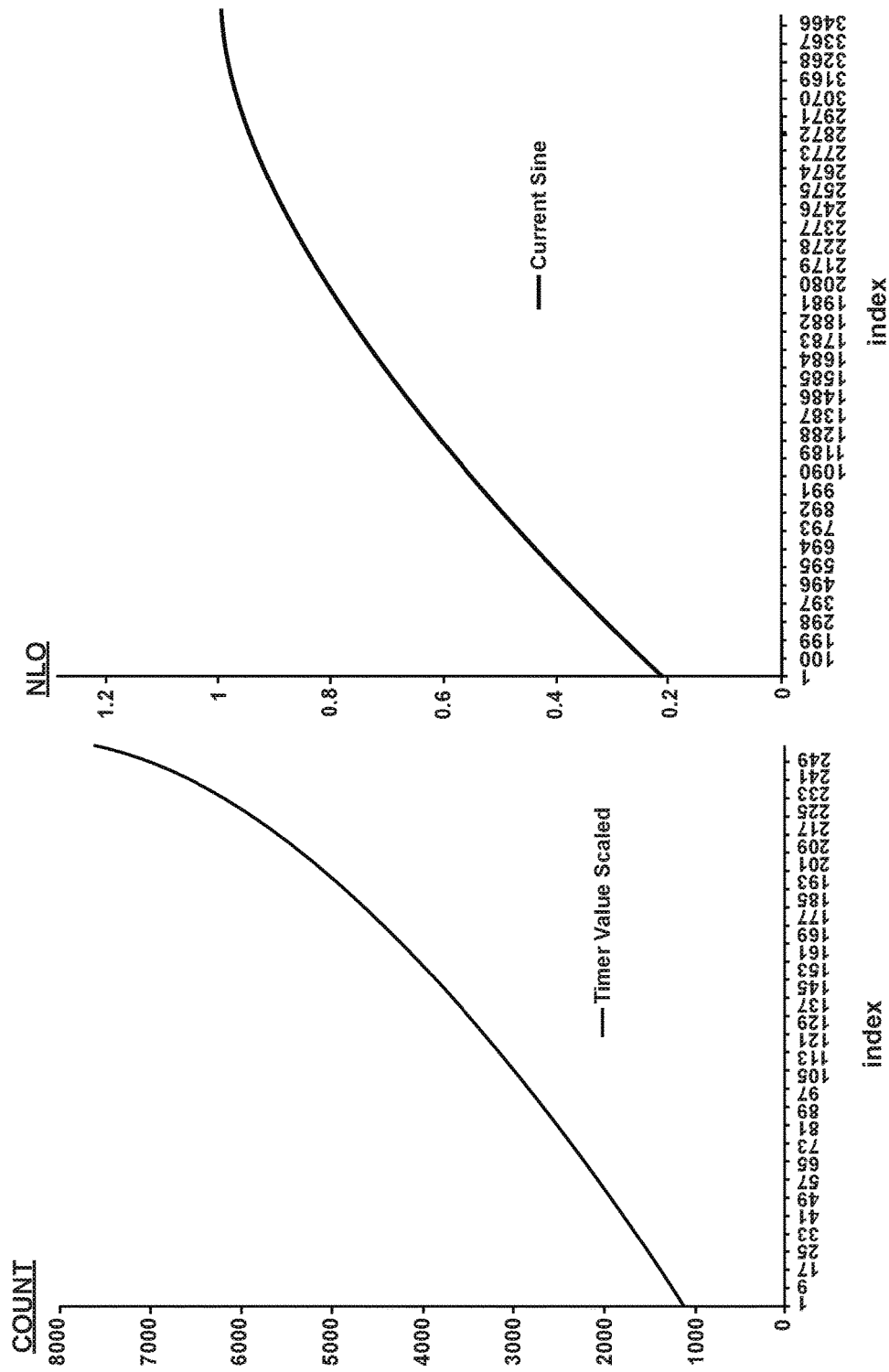
FIG. 10 illustrates a linearization table implementable according to one illustrative embodiment.

It will be noted that the width of the POWER_SW_GATE pulses is a non-linear function of the applied input voltage in the 0 to 10 volt range and is determined by the microcontroller 25 as described above. In one embodiment, a linearization table is employed by the microcontroller 25 for this purpose. In one example, the left graph of FIG. 10 represents PWM times (timer counts) to achieve a linear voltage delivery to the LED load for a 0-10V input from an external source. This correction is shown for 12-90 degrees since LEDs do not operate well below a minimum line voltage that exists below 12 degrees of "on" time. The right graph of FIG. 11 is the sine from 12-90 degrees as a reference with normalized light output light graphed on the vertical axis. The correction is different from 90-180 degrees and depends on LED ballast characteristics. In one embodiment, dip switches may be used to select from different linearization tables for different LED drivers.

Figure 12:
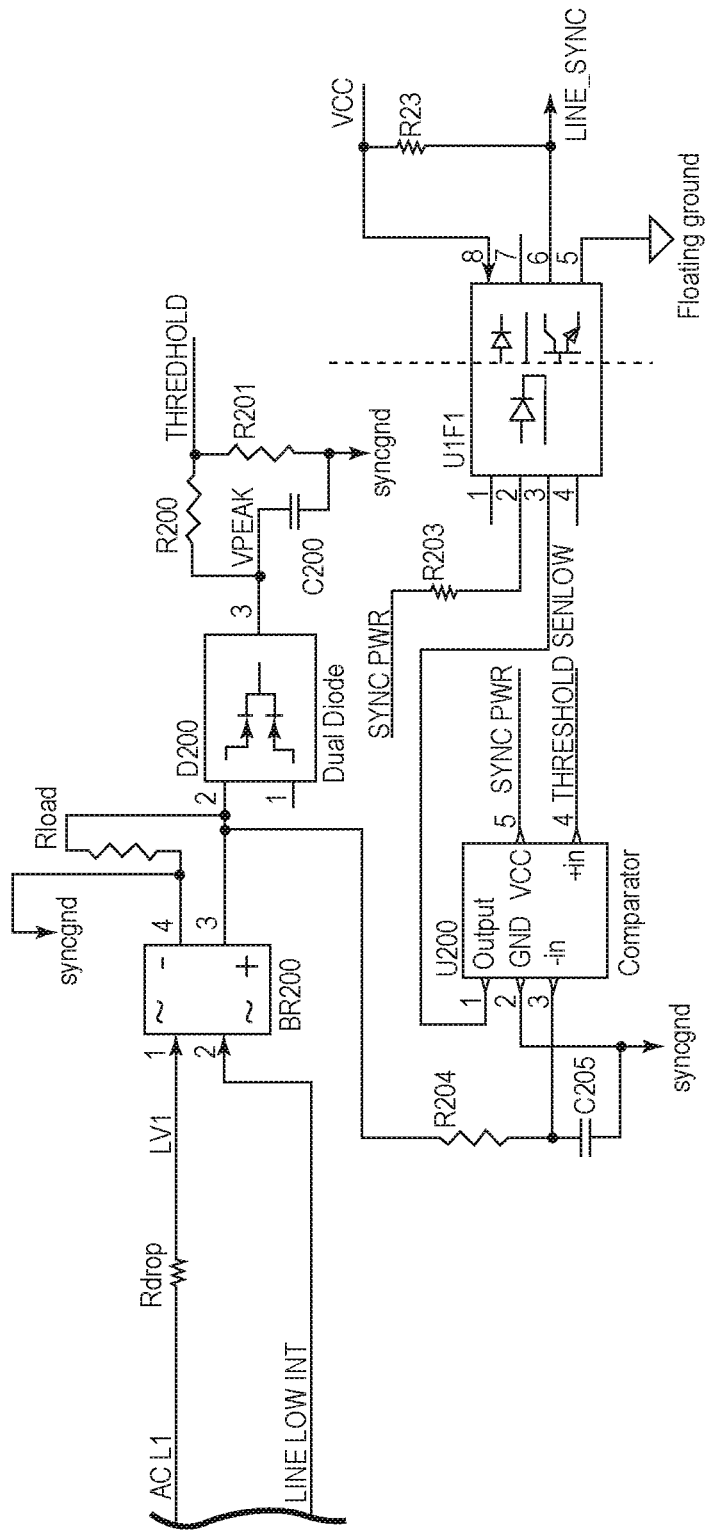
FIG. 12 is a second embodiment of a line sync generation circuit.
Figure 13:
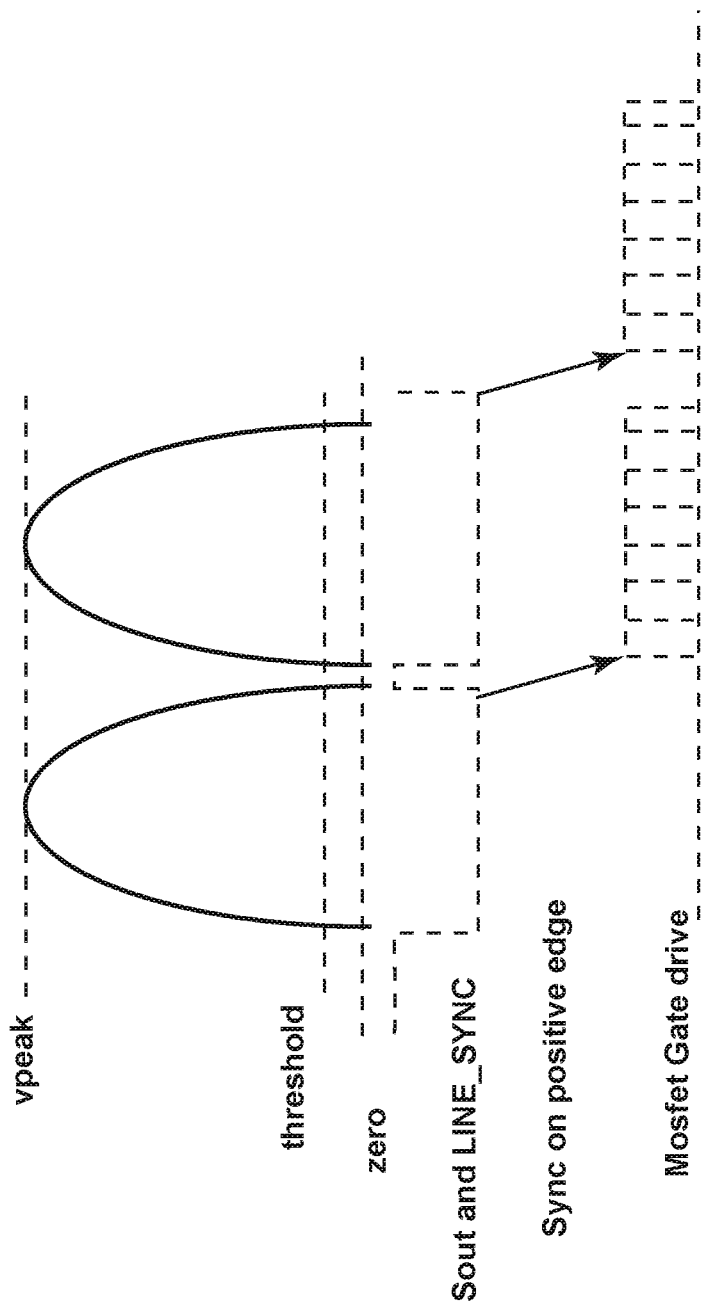
FIG. 13 is a waveform diagram useful in illustrating the operation of the circuit of FIG. 12.

A second embodiment of circuitry for generating the LINE_SYNC signal is shown in FIG. 12. The circuitry of FIG. 12 again receives the AC line connection inputs AC_L1 and Line_Low_INT and outputs a LINE_SYNC synchronization pulse train to the microcontroller 25. Waveforms further illustrating the operation of the circuit of FIG. 12 are shown in FIG. 13.

In the circuit of FIG. 12, the AC line connection inputs are received by a bridge BR200. An Rdrop1/Rload resistive divider reduces the line voltage supplied to a dual diode circuit D200. The dual diode circuit D200 rectifies the AC sine and stores the peak level on a capacitor C200. Resistors R200 and R201 then scale that peak voltage and establish a tracking threshold for zero crossing detection. The peak voltage vpeak and tracking threshold voltage levels are shown in FIG. 13.

With respect to further operation of the circuit of FIG. 12, a resistor R204 and a capacitor C205 filter out any spurious noise on the line and provide an instantaneous line voltage to a comparator U200. The comparator U200 compares the threshold voltage to the filtered line signal on the capacitor C205 to generate a drive signal SENLOW supplied to an optoisolator UIF1, which outputs the LINE_SYNC signal shown in FIG. 13 to the microcontroller 25. As may be seen in FIG. 13, in the embodiment of FIG. 12, the gate drive signal to the FET switch 29 is started in response to the leading edge of the LINE_SYNC signal.

This circuit of FIG. 12 uses a constant load (Rdrop1 and Road) thereby eliminating any timing uncertainty. In addition, the circuit tracks the peak line voltage and adjusts the line sync timing to maintain a constant zero crossing delay. In addition, the rising edge of the detection is utilized because there is less line noise between the previous to the new zero crossing. This is especially evident when the AC line droops or load is shed causing large line voltage fluctuations.

Figure 14:
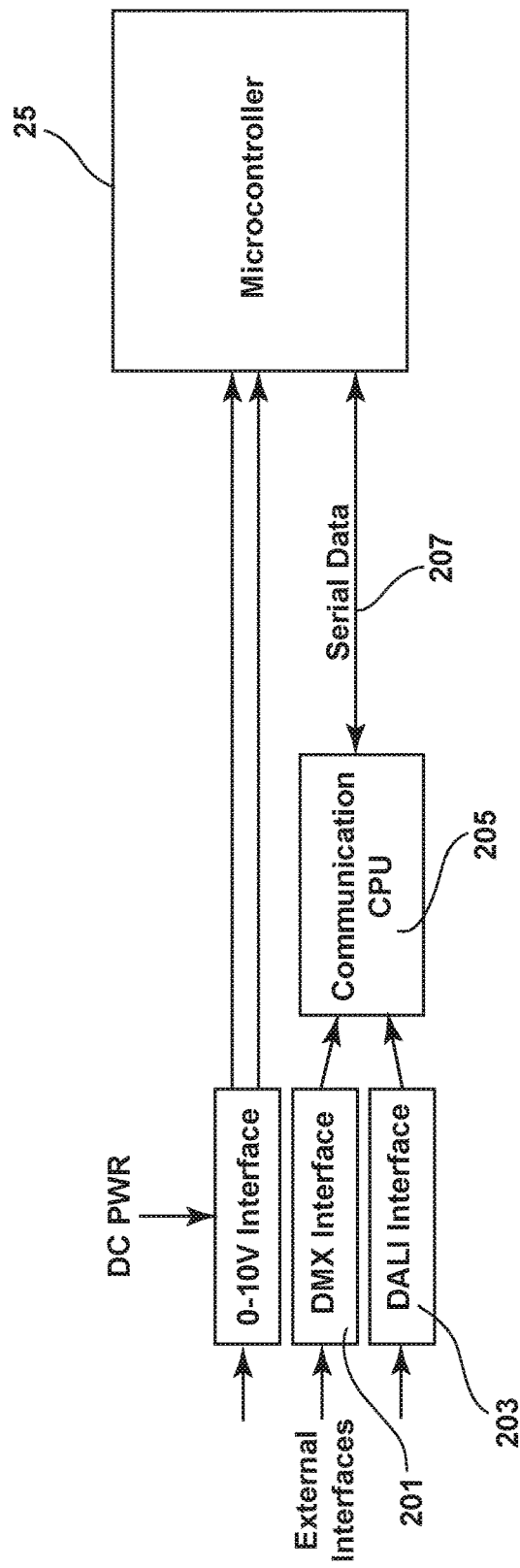
FIG. 14 is a schematic block diagram illustrating a system with DMX and DALI inputs.

FIG. 14 illustrates an alternate embodiment wherein the dimmer control signal input to the microcontroller 25 is derived from a DMX lighting controller 201 or a DALI (Digital and Audio Lighting Interface) controller 203, in addition to the 0 to 10 volt interface and/or a wall dimmer switch. In the system of FIG. 14, a communication CPU (central processing unit) 205 is configured to receive DMX and DALI controller inputs and to translate them into a light level control signal supplied over bus 207 to the microcontroller 25. The microcontroller 25 thereafter controls the output FET 29 to supply an output to an LED driver which causes the appropriate light output to be generated.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. Apparatus for controlling supply of power to an LED driver comprising:
   an AC-DC power supply provided with an AC line input signal;
   a line sync signal generating circuit connected to the current drawn by the AC-DC power supply to generate a line sync signal;
   an input circuit receiving a dimmer input signal and supplying an output signal; and
   a microcontroller receiving the line sync signal and the output signal of the input circuit and configured to output a gate control signal for controlling the power supplied to the LED driver so as to cause a selected amount of dimming of an LED light source to occur;
   wherein the microcontroller is configured to perform a zero crossing calculation based on a current derived from a trailing edge of the line sync signal.

2. The apparatus of claim 1 wherein power is supplied to the LED driver in the form of a reverse phase pulse width modulated signal.

3. The apparatus of claim 1 wherein the microcontroller is configured to select the amount of dimming based at least in part on the magnitude of the dimmer input signal.

4. The apparatus of claim 1 wherein the dimmer input signal is a DC voltage in the range of zero to ten volts.

5. The apparatus of claim 1 wherein the dimmer input signal is derived from one or more of (a) a dimmer wall switch, (b) a DMX controller output, or (c) a DALI controller output.

6. A method for supplying power to an LED driver comprising:
   providing an AC-DC power supply with an AC line input signal;
   generating a line sync signal by monitoring the current drawn by the AC-DC power supply; and
   employing an input dimmer signal and the line sync signal to generate a gate control signal to control the power supplied to the LED driver, the method further comprising determining a zero crossing point based on a trailing edge of the line sync signal.

7. The method of claim 6 wherein the gate control signal is controlled so as to cause a selected amount of dimming of an LED light source.

8. The method of claim 6 further comprising supplying a microcontroller with the input dimmer signal and the line sync signal and employing the microcontroller to generate the gate control signal.

9. The method of claim 6 further comprising supplying said power to the LED driver in the form of a reverse phase pulse width modulated signal.

10. The method of claim 6 further comprising employing the magnitude of the input dimmer signal to determine the selected amount of dimming.

11. The method of claim 6 wherein the input dimmer signal is in the range of zero to ten volts DC.

12. Dimming circuitry for providing a dimming signal to LED driver apparatus comprising:
    an input circuit receiving an AC line signal;
    a line sync circuit comprising an optoisolator, the line sync circuit being configured to generate a line sync signal from the AC line signal, the line sync signal comprising a train of pulses output by the optoisolator;
    a dimmer control voltage section configured to generate a dimmer control voltage from a selected input;
    a microcontroller receiving as inputs the dimmer control voltage and the line sync signal and configured to generate a gate control voltage comprising a train of pulses each of which begins at a zero crossing of the AC line signal; and
    an output circuit comprising a field effect transistor and an optoisolater circuit, the optoisolator circuit being configured to receive the gate control voltage from the microcontroller and to switch the field effect transistor on and off to generate said dimming signal.

13. The dimming circuitry of claim 12 wherein the selected input to the dimmer control voltage section is a voltage in the range of zero to ten volts.

14. The dimming circuitry of claim 12 wherein the selected input comprises a resistive load.

15. The dimming circuitry of claim 12 further comprising circuitry connected to the output circuit and configured to generate a first signal representative of the average output current magnitude.

16. The dimming circuitry of claim 15 further comprising circuitry for comparing a signal representative of the magnitude of the output current to a reference voltage to generate an overcurrent warning signal.

17. The dimming circuitry of claim 16 wherein said first signal and said overcurrent warning signal are supplied to the microcontroller and wherein the microcontroller is configured to pulse an LED a first number of times to provide a visual indication of the overcurrent condition and a second number of times to provide a visual indication of an error condition in the average output current magnitude.

18. The dimming circuitry of claim 12 wherein said dimming signal is an AC drive voltage generated across first and second output terminals of said output circuit.

19. The dimming circuitry of claim 18 wherein said AC drive voltage is a reverse phase pulse width modulated signal.

20. The dimmer circuitry of claim 12 further comprising an AC-DC power supply for generating a DC supply voltage from the AC line signal.

21. Dimming circuitry for providing a dimming signal to LED driver apparatus comprising:
   an input circuit receiving an AC line signal;
   a line sync circuit comprising an optoisolator, the line sync circuit being configured to generate a line sync signal from the AC line signal, the line sync signal comprising a train of pulses output by the optoisolator;
   a dimmer control voltage section configured to generate a dimmer control voltage from a selected input;
   a microcontroller receiving as inputs the dimmer control voltage and the line sync signal and configured to generate a gate control voltage comprising a train of pulses each of which begins at a zero crossing of the AC line signal;
   an output circuit comprising a field effect transistor and an optoisolater circuit, the optoisolator circuit being configured to receive the gate control voltage from the microcontroller and to switch the field effect transistor on and off to generate a reverse phase pulse width modulated dimming signal;
   circuitry connected to the output circuit and configured to generate a first signal representative of an average output current and to compare a signal representative of the magnitude of the output current to a reference voltage to generate an overcurrent warning signal; and
   wherein said first signal and said overcurrent warning signal are supplied to the microcontroller and wherein the microcontroller is further configured to pulse an LED a first number of times to provide a visual indication of the overcurrent condition and a second number of times to provide a visual indication of an error condition in the average output current.

22. The dimming circuitry of claim 12 wherein the dimmer control voltage comprises a signal derived from one or more of (a) a DMN controller output or (b) a DALI controller output.

23. The dimming circuitry of claim 12 wherein the line sync circuit comprises:
   a tracking voltage generation circuit configured to generate a threshold voltage proportional to a peak of the AC line signal; and
   a comparator which compares the AC line signal to the threshold voltage and generates a signal for supply to the optoisolator.

24. The dimming circuitry of claim 23 wherein the line sync generation circuit further comprises a constant resistance load to which the AC line signal is applied.

25. The dimming circuitry of claim 24 wherein the constant resistance load is in the form of a voltage divider.

26. The dimming circuitry of claim 12 wherein the line sync generation circuit comprises a constant resistance load to which the AC line signal is applied.

27. The dimming circuitry of claim 26 wherein the constant resistance load is in the form of a voltage divider.

28. The dimming circuitry of claim 12 wherein the microcontroller is configured to employ a linearization table to determine a width of each pulse of said pulse train based on a magnitude of the input dimmer control voltage.

29. The dimming circuitry of claim 21 wherein the line sync circuit comprises:
   a tracking voltage generation circuit configured to generate a threshold voltage proportional to the peak of the AC line signal; and
   a comparator which compares the AC line signal to the threshold voltage and generates a signal for supply to the optoisolator.

30. The dimming circuitry of claim 29 wherein the line sync generation circuit further comprises a constant resistance load to which the AC line signal is applied.

31. The dimming circuitry of claim 30 wherein the constant resistance load is in the form of a voltage divider.

32. The dimming circuitry of claim 21 wherein the line sync generation circuit comprises a constant resistance load to which the AC line signal is applied.

33. The dimming circuitry of claim 32 wherein the constant resistance load is in the form of a voltage divider.

34. The dimming circuitry of claim 21 wherein the microcontroller is configured to employ a linearization table to determine a width of each pulse of said pulse train based on a magnitude of the input dimmer control voltage.

\* \* \* \* \*